Sept. 20, 1938.  J. B. McCLAIN  2,130,741
STUFFING BOX
Filed April 7, 1937  2 Sheets-Sheet 1

INVENTOR
Jesse B. McClain,
BY
ATTORNEYS.

Sept. 20, 1938.　　　　J. B. McCLAIN　　　　2,130,741
STUFFING BOX
Filed April 7, 1937　　　2 Sheets-Sheet 2

INVENTOR
Jesse B. McClain,
BY
ATTORNEYS

Patented Sept. 20, 1938

2,130,741

UNITED STATES PATENT OFFICE 2,130,741

STUFFING BOX

Jesse B. McClain, Palmyra, N. Y., assignor to The Garlock Packing Company, Palmyra, N. Y., a corporation of New York Application April 7, 1937, Serial No. 135,402

5 Claims. (Cl. 286—39)

This invention relates to stuffing boxes and aims to provide certain improvements therein.

In stuffing boxes adapted for use with rods, pistons or the like, of relatively small diameter, it has been customary to provide a circumferentially threaded, annular gland member which may be rotated to screw it down relatively to a cylinder head or similar stationary member to suitably compress or retain a packing disposed around such rod or piston and between the stationary member and the gland member. In such stuffing boxes the circumferential thread of the gland member ordinarily engages a circumferential thread of the stationary member and, hence, parallelism may be easily maintained between such members and the packing thus may be held at a substantially perfect, normal attitude relatively to the rod and under uniform pressure at all points therearound, whereby to minimize wear both in the packing and the rod.

Where, however, the rod is of relatively large diameter, the friction which would be encountered over the substantial thread surfaces of circumferential threads of the two said members renders it very difficult to attain a proper adjustment of the compression of the packing, and such an arrangement, on the whole, introduces such disadvantages that, for a number of years, said system of gland adjustment has been abandoned on large stuffing boxes in favor of a series of bolts extending around the gland, the bolts being individually adjustable to compress the packing.

This latter system of adjustment, while obviating the disadvantages of the described circumferential thread construction, has the disadvantage that in large packings it is difficult to make level adjustments of the gland. This disadvantage is particularly pronounced where the type of packing used is automatic in its character; that is to say, where compression of the packing rings axially of the rod and the resulting lateral expansion on said rings is caused by the internal pressure of the fluid which operates, or is operated by, the piston. In such cases the greatest nicety of adjustment is required.

The principal object of the present invention is the provision of means for establishing a variable limit of adjustment of such a large annular gland member and for assuring that such gland member will assume a level attitude relatively to the stationary member at such limit of adjustment and uniformly compress the packing and hold it substantially normal to the rod, whereby to minimize friction and resulting wear.

The invention includes other features of improvement which will be more fully hereinafter described.

In the drawings, which illustrate several forms of the invention—

Figure 1:
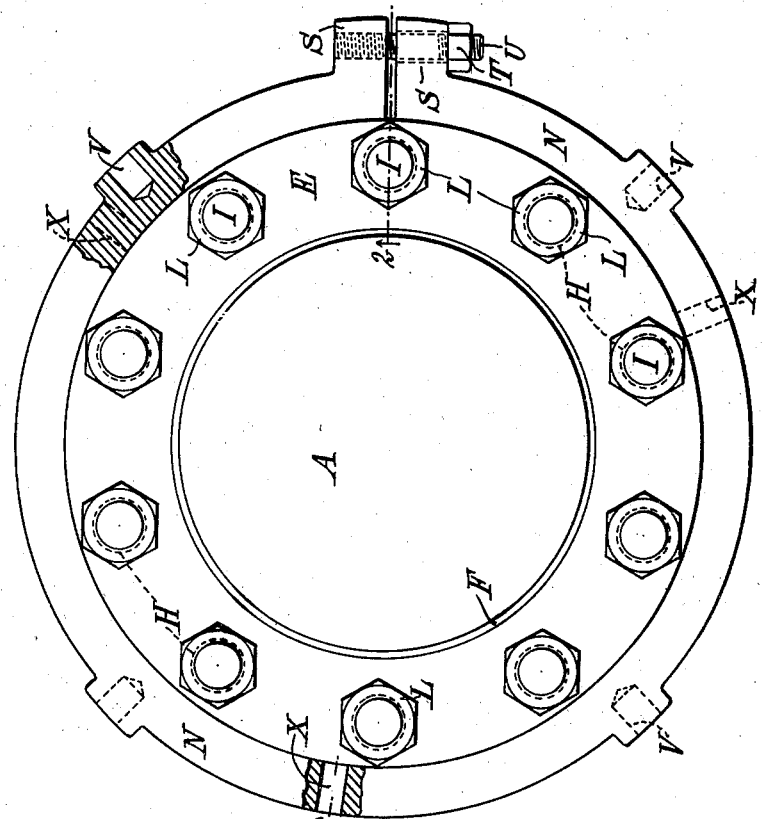
Figure 1 is a plan of the preferred form of the invention, the piston or piston rod and the part to which the stuffing box is applied being omitted.
Figure 2:
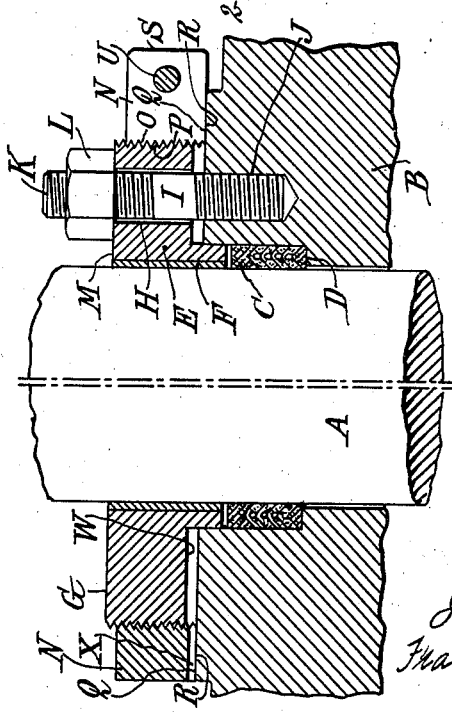
Fig. 2 is a sectional view taken on the line 2—2 of Fig. 1 showing the parts as applied to a piston or piston rod, the cylinder head being shown in section.

Referring to the preferred embodiment of my invention which is shown in Figs. 1 and 2 of the drawings, let A indicate a piston, of let us say, a hydraulic press and B its cylinder head. C indicates any form of compressible packing surrounding the cylinder and located in a recess D formed in the cylinder head. The packing is designed to be compressed or restrained against movement along the piston by a gland E which, if desired, may have a liner F. The gland E usually has a flange G which, in stuffing boxes of considerable size, is provided with a series of holes H at intervals around its periphery, through which holes are designed to pass a series of bolts I which may be headed and adjustably engage threaded sockets J in the cylinder head. Preferably, however, the bolts are jammed in the sockets J and are formed with upper threaded portions K upon which adjustable nuts L are adapted to thread, the under face of the nuts bearing against the upper face M of the gland.

These parts may be of any usual or desirable construction. The particular gland shown, being of large diameter, has ten adjusting bolts, and the particular packing C shown is of the type, hereinafter referred to as automatic packing, which is designed to be expanded by internal pressure of the fluid confined in the hydraulic cylinder which passes up between the piston and the cylinder head to the packing and, because of the peculiar characteristics of the latter, tends to expand it against the piston and the wall of the cylinder head.

The parts which have heretofore been described, including the portion of the cylinder head utilized by the packing, the gland, and some form of adjustment device such as the nuts L and the bolts I, are commonly termed a "stuffing box", and the improvement provided by the present invention may be associated with such a stuffing box in various ways to be hereinafter pointed out.

According to the present invention in its preferred form, there is provided a single adjustable part designed to provide an indicator or stop for controlling the adjustment of the entire series of nuts L and, consequently, the entire circumferential position of the gland.

The particular indicating or stop device which is illustrated in Figs. 1 and 2 comprises a ring or collar N which is internally screw-threaded at O to engage an external screw-thread P formed circumferentially around the flange G of the gland E. Hence, by rotating the collar N, one of its faces—such as its lower face Q—may be adjusted to a point where it meets some fixed portion of the stuffing box—such as the face R on the cylinder head B—as shown. If, now, the nuts L be assumed to be backed up along the bolts K so as to relieve the packing C, it will be observed that the collar N may be screwed downward to any desired point beyond the lower edge of the flange G of the gland E. Each of the nuts L may now be tightened, but only until the two surfaces Q and R of the collar N and cylinder head B come in contact. Since the surface Q completely around the ring N has the same linear projection beyond the lower face of the flange G, and since the surface R is perpendicular to the direction of movement of the gland, it will be seen that when all of the nuts L are tightened, so that the collar at all points contacts with the cylinder head, the gland is accurately held in a level position entirely around the piston, so that there is accurate and uniform compression of the packing at all points about the piston.

Preferably the collar N is split, as shown in Fig. 2, and is provided with lugs S, S which are adapted to be drawn toward each other by a nut T threaded on a bolt U fixed on one lug and passing through the other, as shown. By this means the collar can be clamped tightly in adjusted position so that it will not be moved. Although it is not essential that the collar N be split, as described, there is a distinct practical advantage in such an arrangement. In actual practice the threads of the collar and gland may tighten from heat, corrosion or other cause, but, when the nut T is loosened, the collar will spring open or may be easily sprung open whereby to free it and permit its ready readjustment.

The collar N may be provided with a series of sockets, shown at V, to be engaged by a suitable spanner to facilitate the rotative adjustment of the collar. It may also be provided around its lower face with a series of slots X through which water or other fluid may drain outwardly, one of these slots being best shown in Fig. 2.

In use, when a packing is first installed, the collar N will extend a considerable distance below the lower face W of the flange G. All of the bolts being tightened until there is a firm contact between the lower face of the collar and the upper face of the cylinder head, the packing will be evenly compressed throughout the entire circumference of the piston rod. As the packing requires additional compression, the collar will be rotated as little or as much as may be required to secure the desired compression and the nuts L adjusted further downward on their bolts. In any position the gland will occupy a perfectly level, horizontal position if the piston be a vertical one, or in any event a position in a plane at right angles to the direction of movement of the piston rod.

While the collar N has a threaded engagement entirely around the stuffing box, it is not called upon to do the actual work of compressing the packing, and hence provides no difficulties in adjustment. The actual work of compression is divided among the multiplicity of bolts each of which is independently adjustable.

Figure 3:
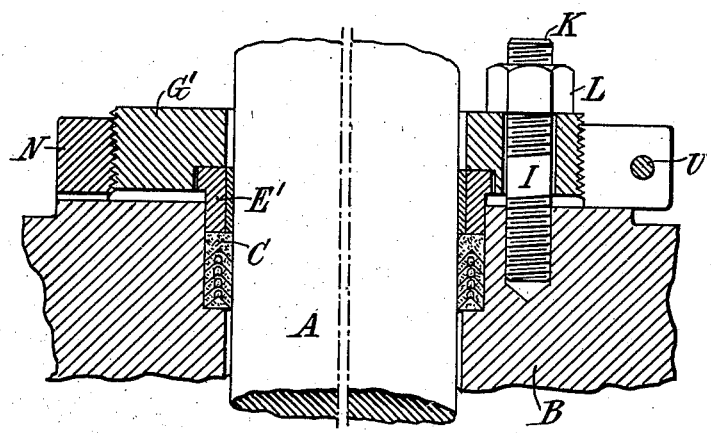
Figs. 3, 4 and 5 are fragmentary sectional views of three modified embodiments of the invention, all taken in planes substantially similar to Fig. 2.

The embodiment of the invention illustrated in Fig. 3 functions similarly to that of Fig. 2 but differs therefrom principally in the provision of a cap G' on which the collar N is threaded, the said cap resting upon a gland or follower E'. The bolts I extend through the cap G' and hence, the latter is adapted to hold the gland E' in proper coacting relationship with the packing C.

Figure 4:
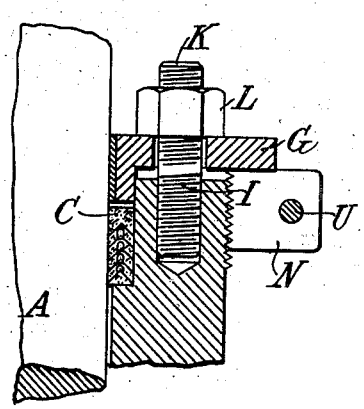
Figure 5:
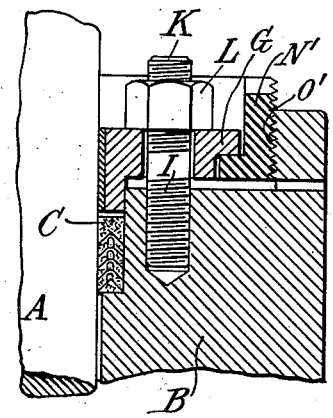

In the structure illustrated in Fig. 4 the collar N is threaded to an exterior thread on the cylinder head B while in Fig. 5 the collar N' is provided with an exterior circumferential thread O' which engages an interior thread on the cylinder head. The collar N' is not shown as a split collar in Fig. 5 but such an arrangement could be effected, if desired by providing suitable clearances between the adjacent vertical surfaces of the collar and the flange G of the gland to allow for contraction of the collar whereby to permit loosening and readjustment thereof.

In the use of prior constructions, particularly when automatic packings are employed, the conventional practice is to select a packing of such dimensions that it is properly confined when the flange of the gland is brought down tight upon the cylinder by the holding nuts. This produces a uniform condition of the packing, but it is limited to a single adjustment and does not allow for variations in the size of the packing, which variations may be caused either in manufacture or by swelling of the packing after it has been in service. Under such practice the gland may be either too tight or too loose, in either case yielding unsatisfactory operation. The use of an adjusting collar as disclosed herein, permits a fine gland adjustment which allows for such variations, while assuring level adjustment of the gland and uniform pressure at all points around the packing, thereby avoiding excessive wear which may otherwise damage the rod or piston.

When automatic packing is employed it is frequently desirable, upon initial installation, to adjust the gland so that it does not actually rest upon or contact the packing, thus affording a working clearance to allow for expansion or swelling of the packing. This adjustment is easily effected in the structure disclosed herein by first setting the gland down to rest upon the packing and then, after adjusting the collar N to rest upon the cylinder head, turning said collar to raise the gland from the packing to the extent of the desired clearance. The clearance may be predetermined with reference to the characteristics of the packing and the extent of the turn required to yield the desired clearance may be determined with reference to the pitch of the thread on the collar.

The invention not only affords a final accurate positioning of the gland in all adjustments, but also has the additional and valuable feature that at all times during an adjusting operation the screws may be advanced in substantially uniform fashion so that at no time does any screw carry an inordinate load. This may be done according to the present invention by forcing down the gland in a series of steps, whereby the gland is repeatedly levelled. In doing this the two operations of tightening the nuts L down upon the collar N and easing off of the said collar slightly may be alternately performed until the desired pressure upon the packing has been attained, when the collar may be clamped to maintain it in the proper position. By this means it is possible to avoid tightening one nut too much while making an adjustment and to assure a substantially even distribution of stresses upon the several bolts I and nuts L, thus assuring uniform coaction between the packing and piston, resulting in a minimum of wear upon the latter. The invention disclosed herein, by permitting uniform adjustment of the gland, also obviates the possibility of failure of one or more of the bolts I as a result of the latter being caused to carry an inordinate share of the pressure from the packing.

In the claims, wherein I have defined the invention, I desire that the word "gland" shall be understood to mean either the actual gland itself or any part which is adjusted by the bolts and nuts and thereby adjusts the gland. Also, I have used the term "leveler" in certain claims to indicate the stop or indicating ring, or its equivalent. The principal feature of the latter is that it shall be a unitary structure capable of level adjustment to form a gauge or stop for a series of packing compressing means which are capable of independent adjustment. Also, I have used the word "rod" to include the piston or other reciprocative or rotative member which it is desired to pack.

Although a preferred form and several modifications of the invention are described herein, it should be obvious that the principles involved may be employed in a variety of ways without departing from the invention as defined in the following claims.

What I claim is:

1. A stuffing box for a rod, comprising two members, relatively adjustable axially of a rod passing therethrough, providing a variable packing space between said members, said members having substantially parallel surfaces coacting to establish a limit to the relative axial adjustment of said members and to insure a substantially parallel relative attitude thereof at such limit of adjustment, one of said members having a packing engaging portion and a unitary leveler on which the latter member's said parallel surface is carried, and said leveler being adjustable axially of said packing engaging portion, whereby to permit variation of the limits of the said packing space while maintaining the relative parallelism of the said members, the said members, further, being substantially non-rotatable relatively to each other and the said unitary leveler having a circumferential-thread engagement with said packing engaging portion, whereby relative axial adjustment of the two may be accomplished by circumferential rotation of the leveler.

2. A stuffing box for a rod, comprising two members, relatively adjustable axially of a rod passing therethrough, providing a variable packing space between said members, said members having substantially parallel surfaces coacting to establish a limit to the relative axial adjustment of said members and to insure a substantially parallel relative attitude thereof at such limit of adjustment, one of said members having a packing engaging portion and a unitary leveler on which the latter member's said parallel surface is carried, and said leveler being adjustable axially of said packing engaging portion, whereby to permit variation of the limits of the said packing space while maintaining the relative parallelism of the said members, the said members being substantially non-rotatable relatively to each other, the said unitary leveler having a circumferential-thread engagement with said packing engaging portion, whereby relative axial adjustment of the two may be accomplished by circumferential rotation of the leveler, and the said leveler, further, comprising a split ring having clamping means for tightening the ring upon the said packing engaging portion.

3. A stuffing box for a rod, comprising two members, relatively adjustable axially of a rod passing therethrough, providing a variable packing space between said members, said members having substantially parallel surfaces coacting to establish a limit to the relative axial adjustment of said members and to insure a substantially parallel relative attitude thereof at such limit of adjustment, one of said members having a packing engaging portion and a unitary leveler on which the latter member's said parallel surface is carried, and said leveler being adjustable axially of said packing engaging portion, whereby to permit variation of the limits of the said packing space while maintaining the relative parallelism of the said members, one of said members being a fixed member and the other being an annular gland member which is substantially non-rotatable relatively to the said fixed member and has independently operable means at a plurality of points therearound for axially adjusting the gland member relatively to the fixed member to vary the limits of said packing space, and the unitary leveler having a circumferential thread-engagement with a packing engaging portion of the fixed member.

4. A stuffing box for a rod, comprising two members, relatively adjustable axially of a rod passing therethrough, providing a variable packing space between said members, said members having substantially parallel surfaces coacting to establish a limit to the relative axial adjustment of said members and to insure a substantially parallel relative attitude thereof at such limit of adjustment, one of said members having a packing engaging portion and a unitary leveler on which the latter member's said parallel surface is carried, and said leveler being adjustable axially of said packing engaging portion, whereby to permit variation of the limits of the said packing space while maintaining the relative parallelism of the said members, one of said members being a fixed member and the other being an annular gland member which is substantially non-rotatable relatively to the said fixed member and has independently operable means at a plurality of points therearound for axially adjusting the gland member relatively to the fixed member to vary the limits of said packing space, and the unitary leveler having a circumferential-thread engagement with a packing engaging portion of the annular gland member.

5. A stuffing box for a rod, comprising a stationary member and a substantially non-rotatable annular gland member, through both of which members a rod passes, independently operable means at a plurality of points about said gland member for adjusting the latter relatively to the stationary member, axially of the rod, and an annular unitary leveler having an annular surface adapted to coact with a parallel annular surface on one of said members to provide a limit of adjustment of said members and to assure substantial parallelism therebetween at said limit of adjustment, and said leveler also having a circumferential-thread engagement with the other of said members, whereby such limit to the relative axial adjustment of the two members may be varied by circumferential rotation of the leveler whereby to vary the packing space between the members.

JESSE B. McCLAIN.